United States Patent
Nishikawa

(10) Patent No.: US 8,903,002 B2
(45) Date of Patent: Dec. 2, 2014

(54) COMMUNICATION DEVICE AND COMMUNICATION METHOD

(71) Applicant: Icom Incorporated, Osaka (JP)

(72) Inventor: Nobuyoshi Nishikawa, Osaka (JP)

(73) Assignee: Icom Incorporated (JP)

( * ) Notice: Subject to any disclaimer, the term of this patent is extended or adjusted under 35 U.S.C. 154(b) by 0 days.

(21) Appl. No.: 14/101,324

(22) Filed: Dec. 9, 2013

(65) Prior Publication Data

US 2014/0301500 A1    Oct. 9, 2014

(30) Foreign Application Priority Data

Apr. 4, 2013    (JP) .................................. 2013-078271
Apr. 4, 2013    (JP) .................................. 2013-078273

(51) Int. Cl.
*H04L 25/49* (2006.01)
*H04L 27/26* (2006.01)

(52) U.S. Cl.
CPC ........ *H04L 27/2602* (2013.01); *H04L 27/2628* (2013.01); *H04L 27/2663* (2013.01)
USPC ........... 375/260; 375/259; 375/295; 375/297; 375/296; 375/316; 375/346; 455/114.1; 455/114.2; 455/114.3; 455/115.1; 455/115.2; 455/115.3; 455/115.4; 455/116; 455/120; 455/125; 455/126

(58) Field of Classification Search
CPC .......... H04B 1/0475; H04B 1/10; H04B 1/62; H04B 15/00; H04B 2001/0408; H04B 2001/0425; H04B 2215/00; H04B 27/2626; H04B 27/2614; H04B 27/36; H04B 27/3411; H04B 2201/70706; H04L 5/0007

USPC ......... 375/259, 260, 295, 296, 297, 316, 346; 455/114.1, 114.2, 114.3, 115.1, 115.2, 455/115.3, 115.4, 116, 120, 125, 126

See application file for complete search history.

(56) References Cited

U.S. PATENT DOCUMENTS

2011/0228818 A1 *  9/2011   Hirama ......................... 375/146

FOREIGN PATENT DOCUMENTS

JP    2006-165781 A    6/2006

* cited by examiner

*Primary Examiner* — Siu Lee
(74) *Attorney, Agent, or Firm* — Baker & McKenzie LLP

(57) ABSTRACT

A computational processor uses a binary signal, being a set of 1- or 0-valued elements of a same number as a number of elements in an input signal, to generate computational data whose elements are exclusive OR values between each element of the input signal and a corresponding element in the binary signal at a same position. The modulator 13 modulates the input signal and the computational data according to a primary modulation scheme, and generates primary-modulated signals. An IFFT calculator applies an inverse fast Fourier transformation to the primary-modulated signals to generate inverse transformation data. A transmitter generates a baseband signal based on generated inverse transformation data whose peak-to-average power ratio matches a standard, and generates and transmits a transmission signal from the baseband signal and data specifying computations conducted to generate the inverse transformation data that matches the standard.

17 Claims, 12 Drawing Sheets

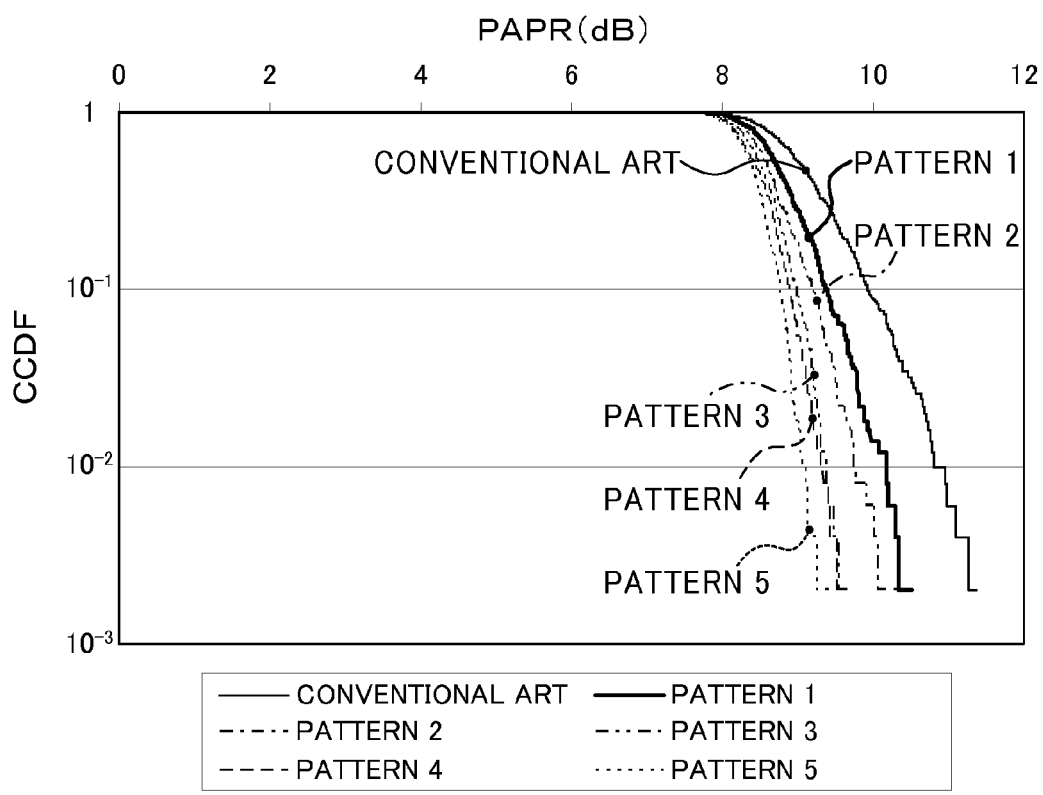

COMMUNICATION DEVICE AND COMMUNICATION METHOD

CROSS-REFERENCE TO RELATED APPLICATION

This application claims the benefit of Japanese Patent Application No. 2013-78271, filed Apr. 4, 2013, and Japanese Patent Application No. 2013-78273, filed Apr. 4, 2013, the entire disclosure of which is incorporated by reference herein.

FIELD

This application relates to a communication device and a communication method.

BACKGROUND

In OFDM (Orthogonal Frequency-Division Multiplexing) communication, input signals are subjected to subcarrier modulation, and the modulated signals are subjected to IFFT (Inverse Fast Fourier Transformation), thereby generating baseband signals. Therefore, if the size of FFT (Fast Fourier Transformation) increases due to the increased number of subcarriers, baseband signals with high peaks are generated, making PAPR (Peak-to-Average Power Ratio) high. The high PAPR requires an amplifier having linearity over a broad range in order to transmit signals without distortion. Therefore, arts to reduce PAPR have been developed.

In an orthogonal frequency division multiplexing communication device disclosed in Unexamined Japanese Patent Application Kokai Publication No. 2006-165781, in order to reduce PAPR, before performing IFFT, the phase of a subcarrier modulation signal is controlled on the basis of an optimal phase calculated by a sequential decision procedure.

The OFDM communication has a problem regarding reducing PAPR. In the orthogonal frequency division multiplexing communication device disclosed in Unexamined Japanese Patent Application Kokai Publication No. 2006-165781, it is required to repeatedly perform calculation processing to find an optimal phase to reduce PAPR and to control a phase for each subcarrier.

SUMMARY

The present invention has been made in view of the above circumstances, and has an objective of reducing the PAPR and simplifying the PAPR reduction process in the OFDM communication.

In order to achieve the above objective, a communication device according to a first aspect of the present invention communicates with another device in orthogonal frequency-division multiplexing wireless communication, and comprises:

a computational processor that uses a binary signal, the binary signal being a set of elements of a same number as a number of elements in an input signal and with element values of 1 or 0, to generate computational data whose elements are values of exclusive OR between each element of the input signal and an element in the binary signal at a same position as each respective element;

a modulator that modulates the input signal and the computational data according to a primary modulation scheme, and generates respective primary-modulated signals;

an IFFT calculator that applies an inverse fast Fourier transformation to the primary-modulated signals to generate respective inverse transformation data; and a transmitter that generates a baseband signal based on inverse transformation data whose peak-to-average power ratio matches a standard from among inverse transformation data generated by the IFFT calculator, and generates and transmits a transmission signal from the baseband signal and data specifying computations conducted to generate the inverse transformation data that matches the standard.

Preferably, the communication device further comprises a determiner that computes a peak-to-average power ratio of a baseband signal based on inverse transformation data generated by the IFFT calculator, and determines whether or not the computed peak-to-average power ratio matches the standard.

Preferably, the communication device further comprises a substitutor that generates the binary signal by substituting 1 or 0 in for each element of a data sequence, the data sequence being a set of real number data of the same number as the number of elements in the input signal, based on whether or not the each element is equal to or greater than a threshold value.

Preferably, the communication device further comprises a repeater that repeats a process of changing the threshold value, conducting processing by the substitutor to generate a new binary signal, and conducting processing by the computational processor, the modulator, the IFFT calculator, and the determiner based on the new binary signal until inverse transformation data that matches the standard is detected.

Preferably, the substitutor uses data comprising a real part or an imaginary part of a Constant Amplitude Zero Auto-Correlation (CAZAC) sequence as the data sequence.

Preferably, the communication device further comprises a selector that computes peak-to-average power ratios of baseband signals based on inverse transformation data generated by the IFFT calculator, and from among the inverse transformation data generated by the IFFT calculator, selects inverse transformation data whose computed peak-to-average power ratio matches the standard.

Preferably, the selector selects inverse transformation data with a lowest peak-to-average power ratio as the inverse transformation data that matches the standard.

Preferably, the computational processor uses a second binary signal, whose elements are ordered in reverse of elements in the binary signal, to additionally generate second computational data whose elements are values of exclusive OR between each element of the input signal and an element in the second binary signal at a same position as each respective element, the modulator modulates the input signal, the computational data, and the second computational data according to the primary modulation scheme, and generates respective primary-modulated signals, the IFFT calculator applies an inverse fast Fourier transformation to the primary-modulated signals, and generates inverse transformation data for each of the input signal, the computational data, and the second computational data, and the selector selects inverse transformation data whose peak-to-average power ratio matches the standard from among inverse transformation data generated from the input signal, the computational data, and the second computational data.

Preferably, the computational processor uses, as the binary signal, a signal whose element value is 1 at elements where a number indicating element position is a prime number, and whose element value is 0 at all other elements.

A communication device according to a second aspect of the present invention communicates with another device in orthogonal frequency-division multiplexing wireless communication, and comprises:

a receiver that receives a transmission signal, generates data specifying computations on a transmission side and a baseband signal, and converts the baseband signal from serial to parallel to generate a parallel signal;

an FFT calculator that applies a fast Fourier transformation to the parallel signal to generate transformation data;

a demodulator that demodulates the transformation data according to a primary modulation scheme, and generates demodulated data; and an inverse computational processor that uses a reception-side binary signal, the reception-side binary signal being a set of elements of a same number as a number of elements in the demodulated data and with element values of 1 or 0, to output, as restored data, one of the demodulated data or inverse computational data whose elements are values of exclusive OR between each element of the demodulated data and an element in the reception-side binary signal at a same position as each respective element, based on the data specifying computations on the transmission side.

Preferably, the communication device further comprises a reception-side substitutor that, in a case where the data specifying computations on the transmission side includes data indicating a threshold value, generates the reception-side binary signal by substituting 1 or 0 in for each element of a data sequence, the data sequence being a set of real number data of the same number as the number of elements in the demodulated data, based on whether or not the each element is equal to or greater than the threshold value.

Preferably, in the case where the data specifying computations on the transmission side includes data indicating the threshold value, the inverse computational processor outputs the inverse computational data as the restored data, and in a case where the data specifying computations on the transmission side does not include information about the threshold value, the inverse computational processor outputs the demodulated data as the restored data.

Preferably, the reception-side substitutor uses data comprising a real part or an imaginary part of a Constant Amplitude Zero Auto-Correlation (CAZAC) sequence as the data sequence.

Preferably, the inverse computational processor uses a second reception-side binary signal, whose elements are ordered in reverse of elements in the binary signal, and outputs, as the restored data, one of the demodulated data, the inverse computational data, or second inverse computational data whose elements are values of exclusive OR between each element of the demodulated data and an element in the second reception-side binary signal at a same position as each respective element, based on the data specifying computations on the transmission side.

Preferably, the inverse computational processor uses, as the reception-side binary signal, a signal whose element value is 1 at elements where a number indicating element position is a prime number, and whose element value is 0 at all other elements.

A communication method according to a third aspect of the present invention is performed by a communication device that communicates with another device in orthogonal frequency-division multiplexing wireless communication, the communication method comprises:

a computational processing step of using a binary signal, the binary signal being a set of elements of a same number as a number of elements in an input signal and with element values of 1 or 0, to generate computational data whose elements are values of exclusive OR between each element of the input signal and an element in the binary signal at a same position as each respective element;

a modulating step of modulating the input signal and the computational data according to a primary modulation scheme, and generating respective primary-modulated signals;

an IFFT calculating step of applying an inverse fast Fourier transformation to the primary-modulated signals to generate respective inverse transformation data; and a transmitting step of generating a baseband signal based on inverse transformation data whose peak-to-average power ratio matches a standard from among inverse transformation data generated by the IFFT calculating step, and generating and transmitting a transmission signal from the baseband signal and data specifying computations conducted to generate the inverse transformation data that matches the standard.

A communication method according to a fourth aspect of the present invention is performed by a communication device that communicates with another device in orthogonal frequency-division multiplexing wireless communication, the communication method comprises:

a receiving step of receiving a transmission signal, generating data specifying computations on a transmission side and a baseband signal, and converting the baseband signal from serial to parallel to generate a parallel signal;

an FFT calculating step of applying a fast Fourier transformation to the parallel signal to generate transformation data;

a demodulating step of demodulating the transformation data according to a primary modulation scheme, and generating demodulated data; and an inverse computational processing step of using a reception-side binary signal, the reception-side binary signal being a set of elements of a same number as a number of elements in the demodulated data and with element values of 1 or 0, to output, as restored data, one of the demodulated data or inverse computational data whose elements are values of exclusive OR between each element of the demodulated data and an element in the reception-side binary signal at a same position as each respective element, based on the data specifying computations on the transmission side.

The present invention can reduce the PAPR and simplify the PAPR reduction process in OFDM communication.

BRIEF DESCRIPTION OF THE DRAWINGS

A more complete understanding of this application can be obtained when the following detailed description is considered in conjunction with the following drawings, in which:

FIG. 11 is a diagram illustrating CCDF characteristics of a baseband signal in the communication device according to the first embodiment;

FIG. 12 is a diagram illustrating a relationship between a threshold value and the PAPR of a baseband signal in the communication device according to the first embodiment.

DETAILED DESCRIPTION

Figure 1:
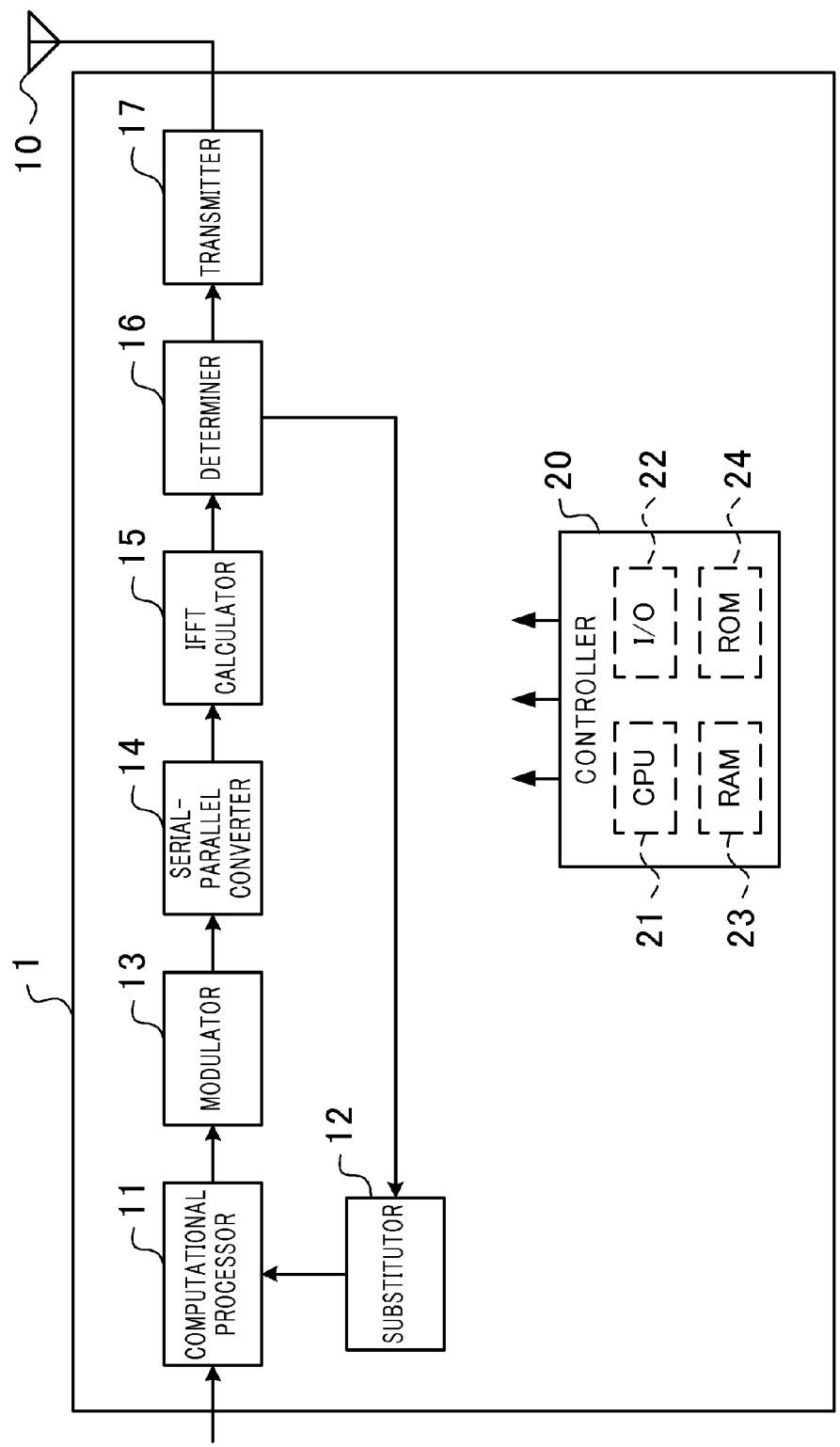
FIG. 1 is a block diagram illustrating an example of configuration of a communication device according to the first embodiment of the present invention.

Hereinafter, exemplary embodiments of the present invention will be described in detail and with reference to the drawings. Note that in the drawings, the same signs are given to the same or similar parts. In the following description, the IFFT (Inverse Fast Fourier Transformation) is taken to be a concept that includes the IFFT and the IDFT (Inverse Discrete Fourier Transformation). Consequently, an embodiment of the present invention may also be configured to apply the IDFT instead of the IFFT. Similarly, the FFT (Fast Fourier Transformation) is taken to be a concept that includes the FFT and the DFT (Discrete Fourier Transformation). Also, in the case of applying the IDFT and the DFT, the FFT size in the following description means the DFT size.

(First Embodiment)

FIG. 1 is a block diagram illustrating an example of configuration of a communication device according to a first embodiment of the present invention. The communication device 1 communicates with another device in OFDM (Orthogonal Frequency-Division Multiplexing) wireless communication. The communication device 1 includes an antenna 10, a computational processor 11, a substitutor 12, a modulator 13, a serial-parallel converter 14, an IFFT calculator 15, a determiner 16, a transmitter 17, and a controller 20.

The controller 20 includes a CPU (Central Processing Unit) 21, RAM (Random Access Memory) 23, and ROM (Read-Only Memory) 24. Signal lines from the controller 20 to each component are omitted to avoid complexity and ease comprehension, but the controller 20 is connected to each component of the communication device 1 via I/O (Input/Output) 22, and controls the starting, ending, and content of these processes.

The RAM 23 holds data for generating a transmit signal, such as a preamble, for example. The ROM 24 stores a control program used by the controller 20 to control the operation of the communication device 1. The controller 20 controls the communication device 1 on the basis of the control program.

Figure 2:
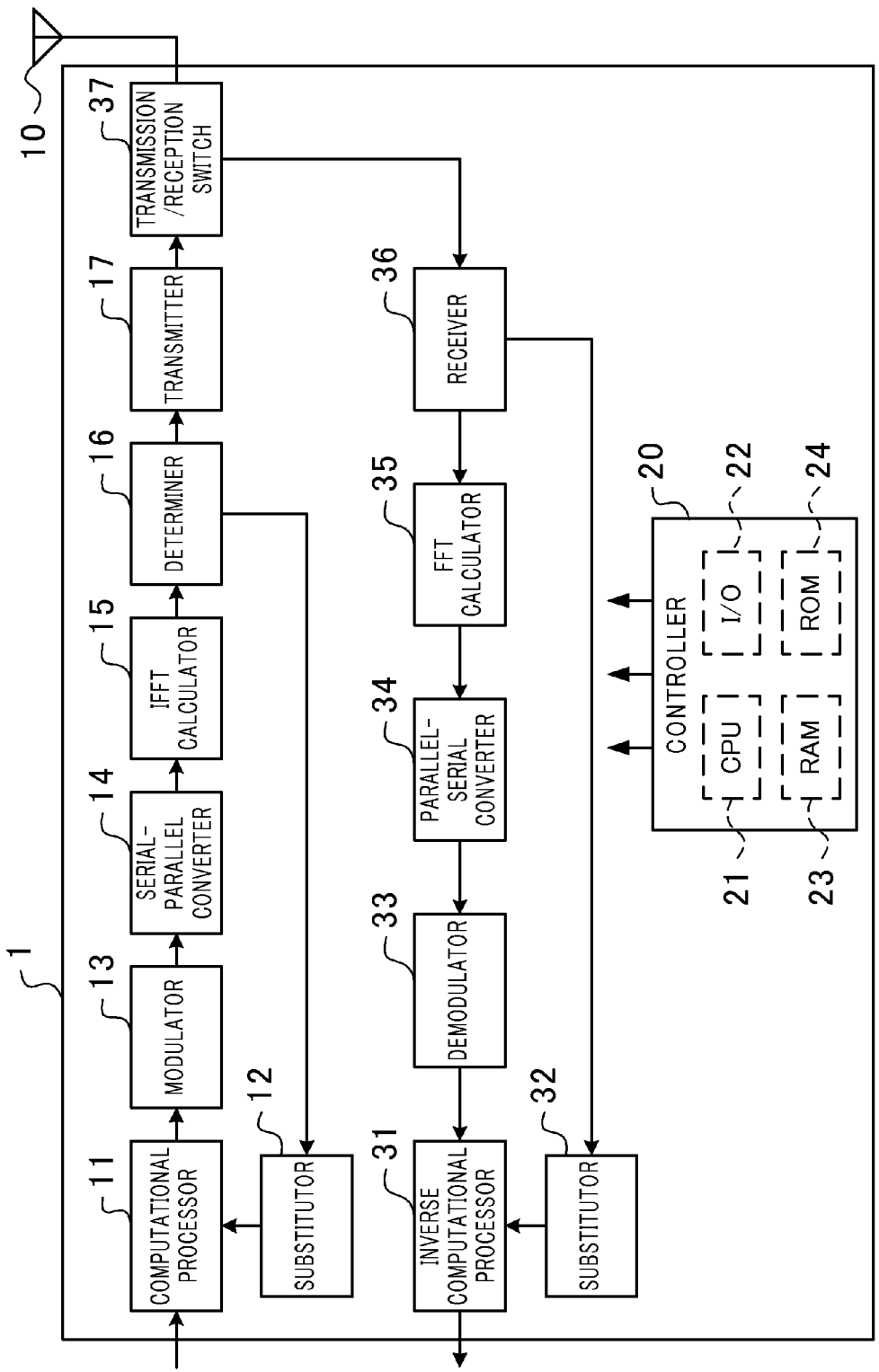
FIG. 2 is a block diagram illustrating a different example of configuration of the communication device according to the first embodiment.

FIG. 2 is a block diagram illustrating a different example of configuration of the communication device according to the first embodiment. In order to equip the above communication device 1 with receiving functions, the communication device 1 illustrated in FIG. 2 additionally includes an inverse computational processor 31, a substitutor 32, a demodulator 33, a parallel-serial converter 34, an FFT calculator 35, a receiver 36, and a transmission/reception switch 37. A communication method conducted by the communication device 1 will be described below with reference to the communication device 1 equipped with transmitting functions and receiving functions as illustrated in FIG. 2.

The substitutor 12 generates a binary signal by substituting 1 or 0 in for each element of an arbitrary data sequence, which is a set of real number data of the same number as the number of elements in the input signal, based on whether or not the each element is equal to or greater than a threshold value. The substitutor 12 sends the generated binary signal to the computational processor 11. The substitutor 12 generates a binary signal by substituting 1 in for an element of a data sequence in the case where that element is equal to or greater than a threshold value, and by substituting in 0 for an element of a data sequence in the case where that element is less than the threshold value, for example.

For the data sequence, the substitutor 12 uses data comprising the real part or the imaginary part of a CAZAC (Constant Amplitude Zero Auto-Correlation) sequence, for example. Also, the threshold value may be arbitrarily determined. In the case of using data comprising the real part or the imaginary part of a CAZAC sequence in which the absolute value of each element is 1 as the data sequence, the values of elements of the data sequence are real numbers that are equal to or greater than −1 and less than or equal to 1, and thus the substitutor 12 uses an arbitrary real number in the range between −1 and 1 inclusive as the threshold value. In the case of using data comprising the real part or the imaginary part of a CAZAC sequence in which the absolute value of each element is 1 as the data sequence, the values of elements of the data sequence are distributed within the range between −1 and 1 inclusive. For this reason, it is possible to further reduce the PAPR (Peak-to-Average Power Ratio) by modifying the threshold value as discussed later. The data sequence is not limited to being data comprising the real part or the imaginary part of a CAZAC sequence. For example, a data sequence comprising random real numbers may be used.

The computational processor 11 generates computational data whose elements are values of exclusive OR between each element of an input signal and an element in the binary signal at a same position as each respective element. The computational processor 11 sends the input signal and the computational data to the modulator 13. The modulator 13 modulates the input signal and the computational data according to a primary modulation scheme, and generates respective primary-modulated signals. The modulator 13 sends the generated primary-modulated signals to the serial-parallel converter 14. The primary modulation scheme is QPSK (Quadrature Phase-Shift Keying), for example.

Provided that the primary modulation scheme is QPSK, and the FFT size is N, an input signal b is expressed by the following equation (1). Also, a data sequence c is expressed by the following equation (2). The data sequence c is taken to be data comprising the real part of a CAZAC sequence with a sequence length of 2N. Provided that a binary signal d is expressed by the following equation (3), computational data e is expressed by the following equation (4).

[Eq. 1]
$$b=[b_1 b_2 \ldots b_{2N}] \tag{1}$$

[Eq. 2]
$$c=[c_1 c_2 \ldots c_{2N}] \tag{2}$$

[Eq. 3]
$$d=[d_1 d_2 \ldots d_{2N}] \tag{3}$$

[Eq. 4]
$$e=[XOR(b_1,d_1) XOR(b_2,d_2) \ldots XOR(b_{2N},d_{2N})] \tag{4}$$

The serial-parallel converter 14 converts the primary-modulated signals from serial to parallel, and sends the converted primary-modulated signals to the IFFT calculator 15. The IFFT calculator 15 applies the IFFT to the converted primary-modulated signals, and generates inverse transformation data for each of the input signal and the computational data. The IFFT calculator 15 sends the generated inverse transformation data to the determiner 16.

The determiner 16 computes a PAPR of a baseband signal based on inverse transformation data generated by the IFFT calculator 15, and determines whether or not the computed PAPR matches a standard. In the case of determining that the PAPR does not match the standard, the determiner 16 reports the result to the substitutor 12. The substitutor 12 changes the threshold value, and generates a new binary signal. The computational processor 11, the modulator 13, the serial-parallel converter 14, the IFFT calculator 15, and the determiner 16 conduct the above processes based on the new binary signal. The controller 20 operates as a repeater that causes the substitutor 12, the computational processor 11, the modulator 13, the serial-parallel converter 14, the IFFT calculator 15, and the determiner 16 to repeat the above processes until inverse transformation data matching the standard is detected.

The substitutor 12 is able to predefine a finite number of threshold values $th_j$, as in equation (5) below, for example. The substitutor 12 may also be configured to repeat a process while sequentially changing the threshold value $th_j$.

[Eq. 5]

$$th_j \in \{-0.8, -0.4, 0, 0.4, 0.8\} \quad (5)$$

In the case of detecting that the inverse transformation data does match the standard, the determiner 16 sends the inverse transformation data to the transmitter 17. The communication device 1 may be configured to repeat the above processes for all preset threshold values, or for a designated number of times, and detect the inverse transformation data with the lowest PAPR above as the inverse transformation data matching the standard. Also, the communication device 1 may be configured to repeat the above processes and detect the inverse transformation for which the above PAPR is less than or equal to a threshold value as the inverse transformation data matching the standard.

The case in which the primary modulation scheme is QPSK, the FFT size is N, and five threshold values are preset in the substitutor 12 as in equation (5) above will be described as an example. A binary signal $d_1(th_j)$ generated by the substitutor 12 based on a threshold value $th_j$ is expressed by equation (6) below.

[Eq. 6]

$$d_1(th_j) = [d_1 d_2 \ldots d_{2N}] \quad (6)$$

Computational data generated by the computational processor 11 based on the input signal and the binary signal $d_1(th_j)$ is expressed as $e_1(th_j)$, similarly to equation (4) above. Inverse transformation data generated based on the computational data $e_1(th_j)$ is expressed as $f_1(th_j)$. As expressed in equation (5) above, the respective threshold values are set to threshold value $th_1 = -0.8$, threshold value $th_2 = -0.4$, threshold value $th_3 = 0$, threshold value $th_4 = 0.4$, and threshold value $th_5 = 0.8$. Also, inverse transformation data generated based on the input signal is expressed as $f_1$.

The determiner 16 computes the PAPR for baseband signals respectively based on the inverse transformation data $f_1(th_1)$, $f_1(th_2)$, $f_1(th_3)$, $f_1(th_4)$, $f_1(th_5)$, and $f_1$, for example, detects the inverse transformation data with the lowest PAPR, and sends the detected inverse transformation data to the transmitter 17. A similar process is conducted on subsequent input signals, and inverse transformation data for which the PAPR matches the standard is respectively sent to the transmitter 17.

The transmitter 17 combines the inverse transformation data to generate a baseband signal, generates a transmission signal from the baseband signal and data specifying computations conducted to generate the inverse transformation data that matches the standard, and transmits the transmission signal to another device via the transmission/reception switch 37 and the antenna 10.

Figure 3:
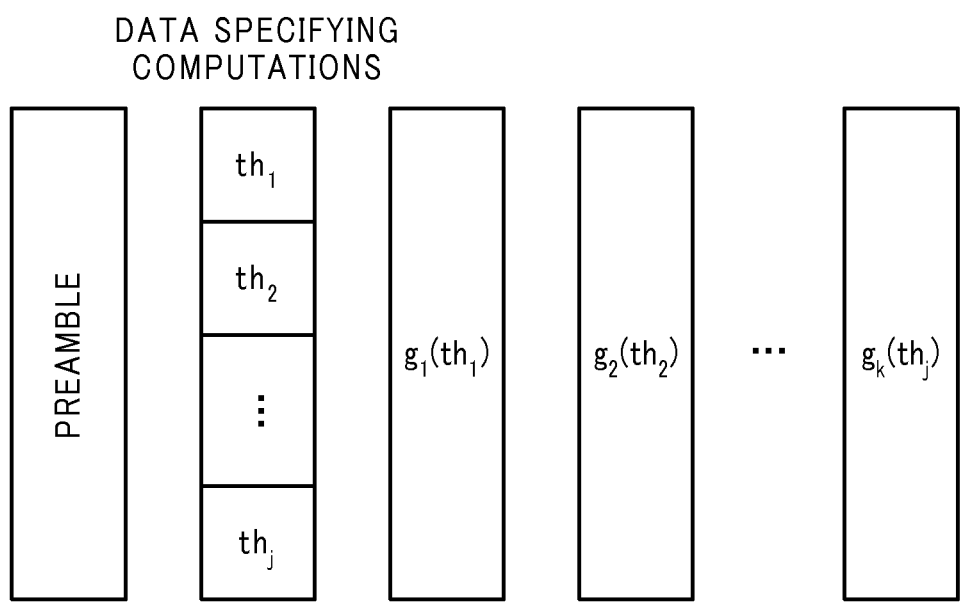
FIG. 3 is a block diagram illustrating an example of a transmission signal sent by the communication device according to the first embodiment.

FIG. 3 is a block diagram illustrating an example of a transmission signal sent by the communication device according to the first embodiment. The transmission signal includes a preamble, data specifying computations conducted to generate inverse transformation data that matches the standard, and baseband signals $g_1(th_1)$, $g_2(th_2)$, $g_k(th_j)$. In the example in FIG. 3, k baseband signals are included in the transmission signal.

The above data specifying computations includes data indicating a threshold value used by the substitutor 12 when generating a binary signal corresponding to inverse transformation data that matches the standard, or designated data indicating that inverse transformation data that matches the standard was generated by serial-parallel converting a primary-modulated signal based on an input signal, and applying the IFFT. For example, provided that the threshold values expressed in equation (5) above are used in the substitutor 12, in the case where the inverse transformation data $f_1(th_1)$ matches the standard, data indicating $th_1$ is included in the data specifying computations conducted to generate inverse transformation data that matches the standard. Meanwhile, in the case where the inverse transformation data $f_1$ matches the standard, designated data indicating inverse transformation data $f_1$ based on the input signal is included in the data specifying computations conducted to generate inverse transformation data that matches the standard. In the example in FIG. 3, $th_1$ is the threshold value used to generate inverse transformation data corresponding to the first baseband signal, and $th_2$ is the threshold value used to generate inverse transformation data corresponding to the second baseband signal.

The above data specifying computations is data obtained by applying primary modulation to and combining respective threshold values or designated data, for example. For example, provided that 8-bit data is used as the data indicating a threshold value or designated data, the primary modulation scheme is QPSK, and the FFT size is 2048, the data specifying computations may include 512 sets of the above data specifying computations. Note that the size of the data indicating a threshold value or designated data is arbitrary, and the value of designated data may be arbitrarily determined. Information about the size of data indicating a threshold value or designated data, as well as the value of designated data, is shared in advance between the transmission and reception sides. By including the above data specifying computations in the transmission signal, it becomes possible to correctly restore the input signal on the reception side.

Figure 4:
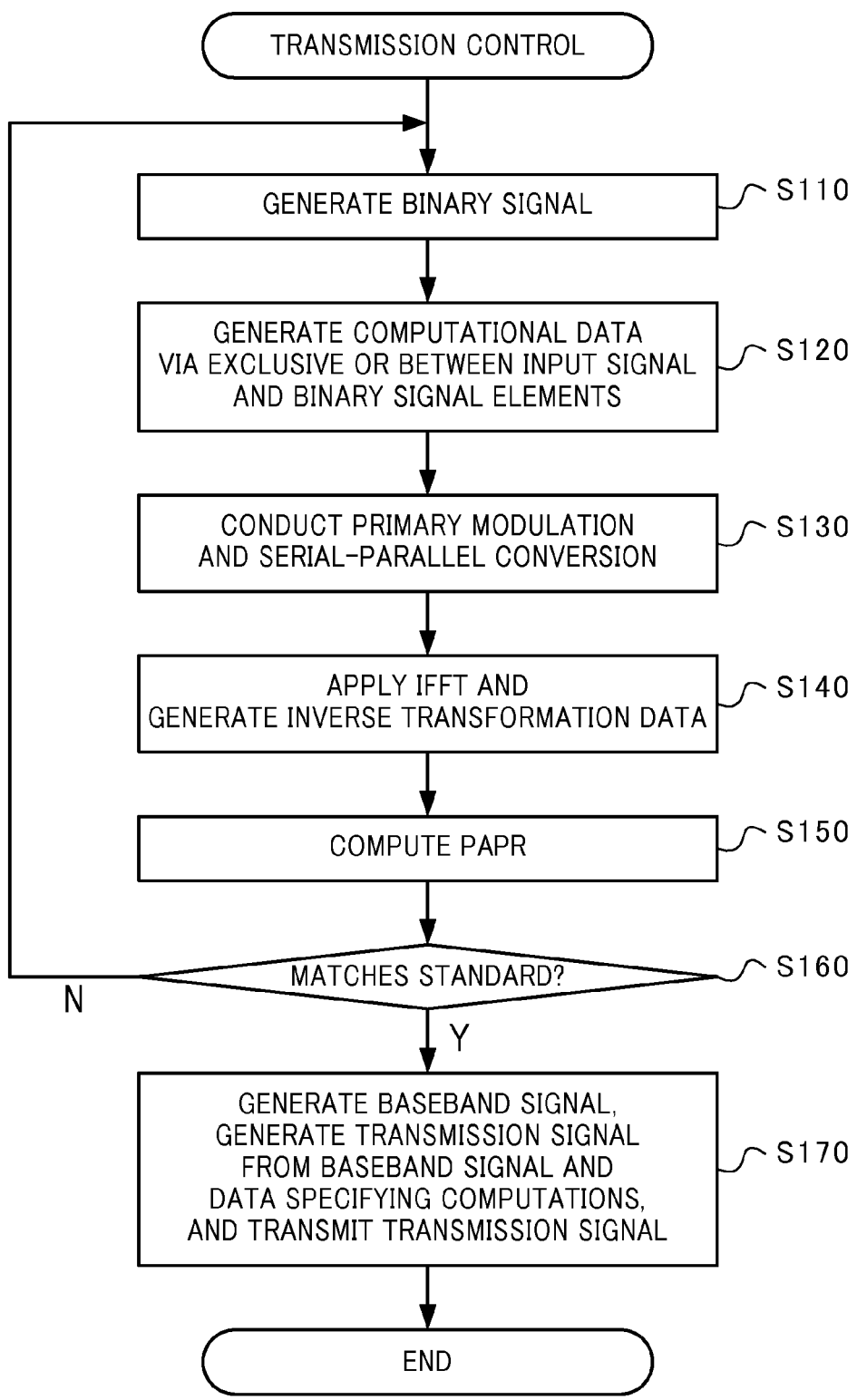
FIG. 4 is a flowchart illustrating an example of transmission control operation performed by the communication device according to the first embodiment.

FIG. 4 is a flowchart illustrating an example of transmission control operation performed by the communication device according to the first embodiment. The substitutor 12 generates a binary signal by substituting 1 or 0 in for each element of an arbitrary data sequence, which is a set of real number data of the same number as the number of elements in the input signal, based on whether or not the each element is equal to or greater than a threshold value (step S110). The computational processor 11 generates computational data whose elements are the values of the exclusive OR between each element of an input signal and an element in a binary signal at the same position as each respective element (step S120). The modulator 13 modulates the input signal and the computational data according to a primary modulation scheme, and the serial-parallel converter 14 converts the respective primary-modulated signals from serial to parallel (step S130).

The IFFT calculator 15 applies the IFFT to the converted primary-modulated signals, and generates inverse transformation data for each of the input signal and the computational data (step S140). The determiner 16 computes the PAPR of a baseband signal based on the inverse transformation data, and determines whether or not the PAPR matches a standard (step S150). In the case where the PAPR does not match the standard (step S160; N), the process returns to step S110, and the controller 20 changes the threshold value, generates a new binary signal, and repeats the above process. In the case where the PAPR does match the standard (step S160; Y), the transmitter 17 combines the inverse transformation data to generate a baseband signal, generates a transmission signal from the baseband signal and data specifying computations conducted to generate the inverse transformation data that matches the standard, and transmits the transmission signal to another device via the transmission/reception switch 37 and the antenna 10 (step S170). Once the transmission processing in step S170 is completed, the communication device 1 ends the process.

A process on the reception side is described below. The receiver 36 receives a transmission signal via the antenna 10 and the transmission/reception switch 37, and generates data specifying computations on a transmission side as well as a baseband signal. The receiver 36 sends the data specifying computations on the transmission side to the substitutor 32, generates a parallel signal by converting the baseband signal from serial to parallel, and sends the generated parallel signal to the FFT calculator 35. In the case where the data specifying computations on the transmission side is primary-modulated, the receiver 36 demodulates the data specifying computations on the transmission side according to a primary modulation scheme, and sends the demodulated data specifying computations on the transmission side to the substitutor 32. Information about whether or not to demodulate the data specifying computations on the transmission side is held on the reception side.

The FFT calculator 35 applies the FFT to the parallel signal to generate transformation data, which is sent to the parallel-serial converter 34. The parallel-serial converter 34 converts the transformation data from parallel to serial, and sends the converted transformation data to the demodulator 33. The demodulator 33 demodulates the converted transformation data according to a primary modulation scheme to generate demodulated data, which is sent to the inverse computational processor 31.

In the case where the data specifying computations on the transmission side includes data indicating a threshold value, the substitutor 32 generates a reception-side binary signal by substituting 1 or 0 in for each element of a data sequence, which is a set of real number data of the same number as the number of elements in the demodulated data, based on whether or not the each element is equal to or greater than that threshold value. The data sequence is the same as the data sequence used by the substitutor 12 on the transmission side. The reception-side binary signal matches the binary signal which corresponds to the transmitted inverse transformation data, and which was generated by the substitutor 12.

In the case where the data specifying computations on the transmission side includes data indicating a threshold value, the inverse computational processor 31 outputs, as restored data, inverse computational data whose elements are values of exclusive OR between each element of the demodulated data converted from parallel to serial and an element in the reception-side binary signal at the same position as each respective element. Meanwhile, in the case where the data specifying computations on the transmission side does not include data indicating a threshold value, or in other words, the data is data indicating inverse transformation data based on the input signal, the inverse computational processor 31 outputs, as restored data, the demodulated data converted from parallel to serial.

Figure 5:
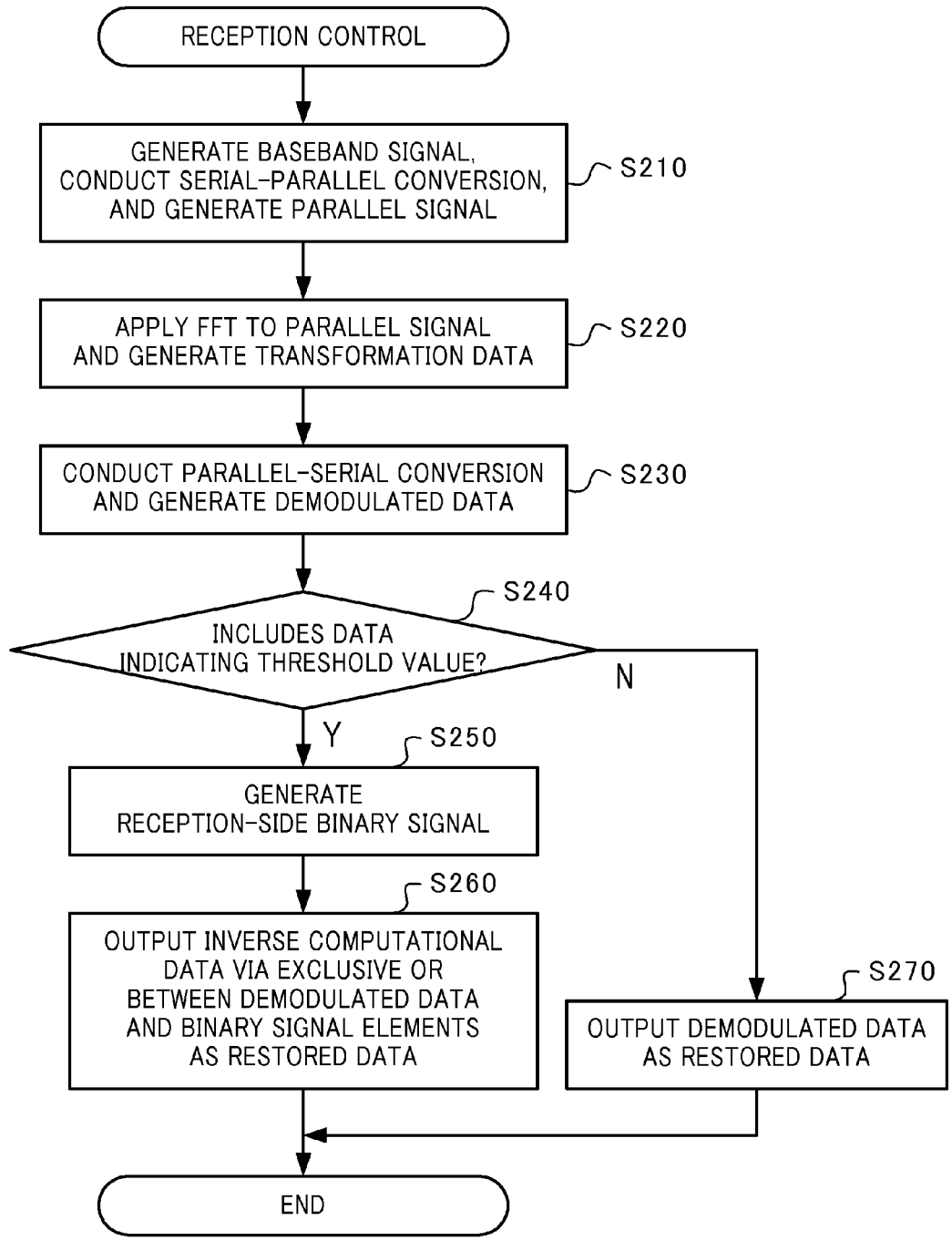
FIG. 5 is a flowchart illustrating an example of reception control operation performed by the communication device according to the first embodiment.

FIG. 5 is a flowchart illustrating an example of reception control operation performed by the communication device according to the first embodiment. The receiver 36 receives a transmission signal via the antenna 10 and the transmission/reception switch 37, generates data specifying computations on the transmission side as well as a baseband signal, and converts the baseband signal from serial to parallel to generate a parallel signal (step S210). The FFT calculator 35 applies the FFT to the parallel signal to generate transformation data (step 220). The parallel-serial converter 34 converts the transformation data from parallel to serial, and the demodulator 33 demodulates the converted transformation data according to a primary modulation scheme to generate demodulated data (step S230).

In the case where the data specifying computations on the transmission side includes data indicating a threshold value (step S240; Y), the substitutor 32 generates a reception-side binary signal by substituting 1 or 0 in for each element of a data sequence, which is a set of real number data of the same number as the number of elements in the demodulated data, based on whether or not the each element is equal to or greater than that threshold value (step S250). Subsequently, the inverse computational processor 31 outputs, as restored data, inverse computational data whose elements are the exclusive OR between each element of the demodulated data converted from parallel to serial and the element in the reception-side binary signal at the same position as each respective element (step S260).

In the case where the data specifying computations on the transmission side does not include data indicating a threshold value, (step S240; N), the inverse computational processor 31 outputs, as restored data, the demodulated data converted from parallel to serial (step S270). Once the restoration processing in steps S260 and S270 are completed, the communication device 1 ends the process.

As described above, according to a communication device 1 in accordance with the first embodiment of the present invention, it becomes possible to reduce the PAPR by conducting the computational processing discussed above in an OFDM communication scheme. The computational processing discussed above is a simple method compared to repeating a calculation process according to a sequential decision method, and according to a communication device 1 in accordance with the first embodiment of the present invention, it becomes possible to simplify the process of reducing the PAPR. Also, as discussed later, it becomes possible to control the extent of the reduction in the PAPR.

(Second Embodiment)

Figure 6:
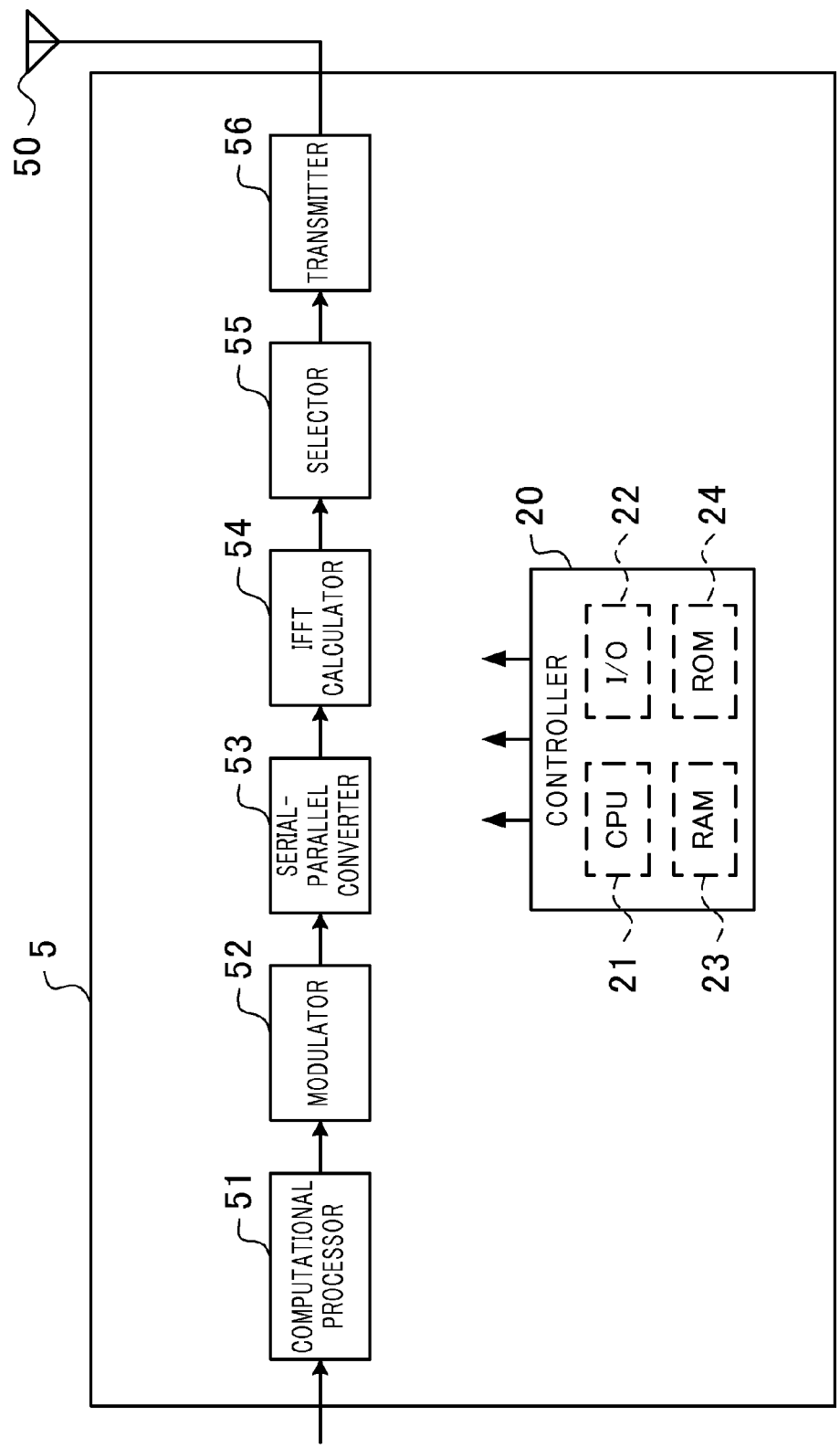
FIG. 6 is a block diagram illustrating an example of configuration of a communication device according to the second embodiment of the present invention.

FIG. 6 is a block diagram illustrating an example of configuration of a communication device according to a second embodiment of the present invention. The communication device 5 communicates with another device in OFDM wireless communication. The communication device 5 includes an antenna 50, a computational processor 51, a modulator 52, a serial-parallel converter 53, an IFFT calculator 54, a selector 55, a transmitter 56, and a controller 60.

The controller 60 includes a CPU 61, RAM 63, and ROM 64. Signal lines from the controller 60 to each component are omitted to avoid complexity and ease comprehension, but the controller 60 is connected to each component of the communication device 5 via I/O 62, and controls the starting, ending, and content of these processes.

The RAM 63 holds data for generating a transmission signal, such as a preamble, for example. The ROM 64 stores a control program used by the controller 60 to control the operation of the communication device 5. The controller 60 controls the communication device 5 based on the control program.

Figure 7:
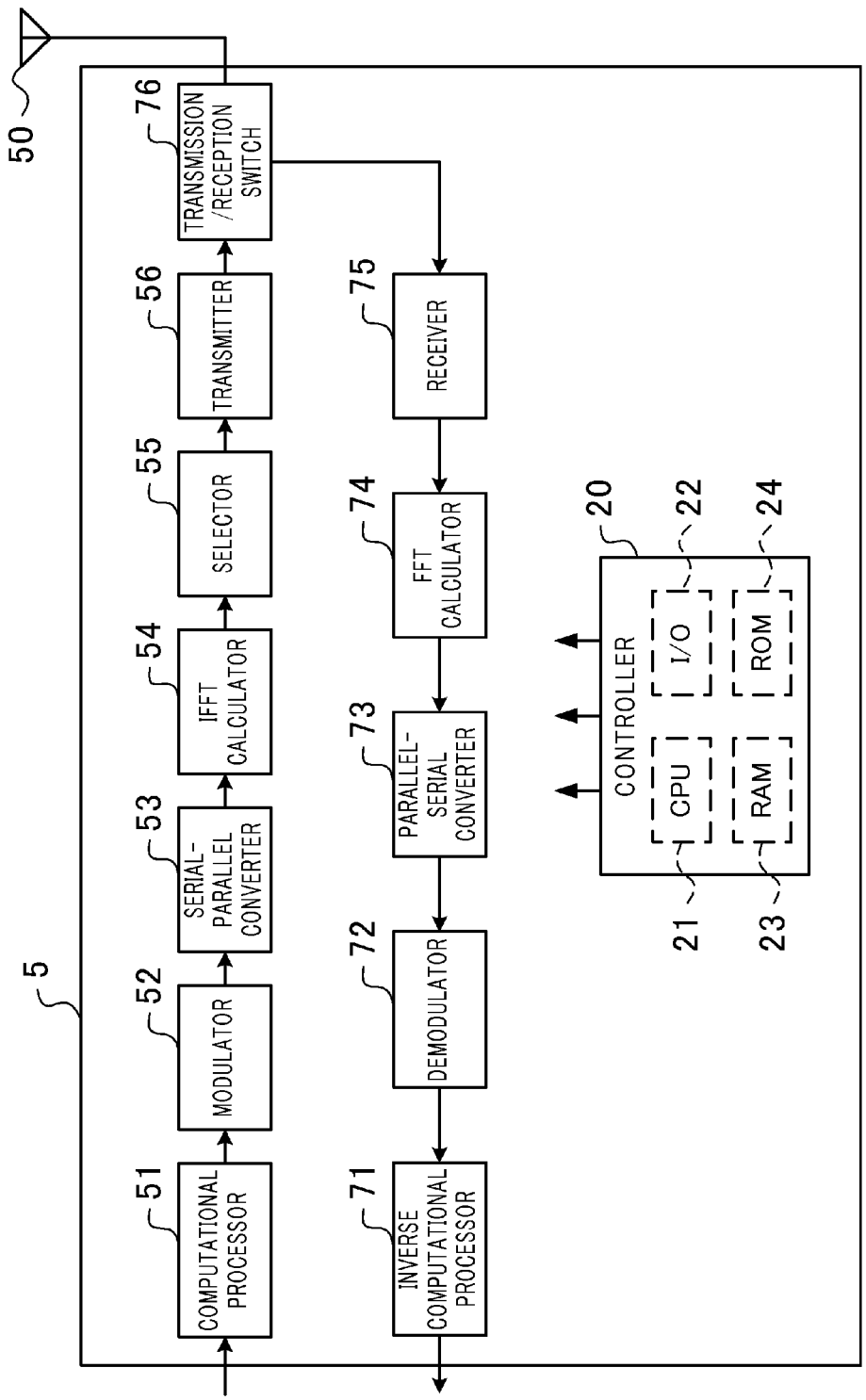
FIG. 7 is a block diagram illustrating a different example of configuration of the communication device according to the second embodiment.

FIG. 7 is a block diagram illustrating a different example of configuration of the communication device according to the second embodiment. In order to equip the above communication device 5 with receiving functions, the communication device 5 illustrated in FIG. 7 additionally includes an inverse computational processor 71, a demodulator 72, a parallel-serial converter 73, an FFT calculator 74, a receiver 75, and a transmission/reception switch 76. A communication method conducted by the communication device 5 will be described below with reference to the communication device 5 equipped with transmitting functions and receiving functions as illustrated in FIG. 7.

The computational processor 51 uses an arbitrary binary signal, which is a set of elements of a same number as a number of elements in the input signal, and whose elements take a value of 1 or 0, as well as a second binary signal whose elements are ordered in reverse of elements in the binary signal, and generates at least one of first computational data whose elements are values of exclusive OR between each element of the input signal and an element in the binary signal at a same position as each respective element, and second computational data whose elements are values of exclusive OR between each element of the input signal and an element in the second binary signal at a same position as each respective element. The second binary signal is a signal in which the order of element is reversed compared to the binary signal. For the binary signal, there is used a signal whose element value is 1 at elements for which a number indicating the element position is a prime number, and whose element value is 0 at all other elements. Random data whose element values are 1 or 0 may also be used as the binary signal. The computational processor 51 sends the input signal, and at least one of the first computational data and the second computational data, to the modulator 52.

The modulator 52 modulates the input signal, and at least one of the first computational data and the second computational data, according to a primary modulation scheme, and generates respective primary-modulated signals. The modulator 52 sends the generated primary-modulated signals to the serial-parallel converter 53. The primary modulation scheme is QPSK, for example.

Provided that the primary modulation scheme is QPSK, and the FFT size is N, an input signal b is expressed by the following equation (7). The binary signal p, which is a signal whose element value is 1 at elements for which a number indicating the element position is a prime number, and whose element value is 0 at all other elements, is expressed by the following equation (8). The numbers above the sequence in equation (8) below are numbers indicating the positions of elements.

[Eq. 7]

$$b = [\, b_1 \quad b_2 \quad \ldots \quad b_{2N}\,] \tag{7}$$

[Eq. 8]

$$p = [\overset{1}{0} \quad \overset{2}{1} \quad \overset{3}{1} \quad \overset{4}{0} \quad \overset{5}{1} \quad \ldots ] \tag{8}$$

Provided that the primary modulation scheme is QPSK, and the FFT size is 4, the binary signal p in equation (8) above is expressed by the following equation (9). Also, the second binary signal $p^{-1}$ whose elements are ordered in the reverse of the elements in the binary signal p is expressed by the following equation (10).

[Eq. 9]

$$p = [0\ 1\ 1\ 0\ 1\ 0\ 1\ 0] \tag{9}$$

[Eq. 10]

$$p^{-1} = [0\ 1\ 0\ 1\ 0\ 1\ 1\ 0] \tag{10}$$

For example, the computational processor 51 generates first computational data whose elements are the values of the exclusive OR between each element of an input signal having eight elements and an element in the binary signal p expressed by equation (9) above at the same position as each respective element. Also, the computational processor 51 generates second computational data whose elements are the values of the exclusive OR between each element of the input signal and an element in the second binary signal $p^{-1}$ expressed by equation (10) above at the same position as each respective element. The modulator 52 modulates the input signal, the first computational data, and the second computational data according to a primary modulation scheme, and generates respective primary-modulated signals.

The serial-parallel converter 53 converts the primary-modulated signals from serial to parallel, and sends the converted primary-modulated signals to the IFFT calculator 54. The IFFT calculator 54 applies the IFFT to the converted primary-modulated signals, and generates inverse transformation data for each of the input signal, the first computational data, and the second computational data. The IFFT calculator 54 sends the generated inverse transformation data to the selector 55. The selector 55 computes PAPRs of baseband signals based on inverse transformation data generated by the IFFT calculator 54, and selects inverse transformation data with a lowest PAPR from among the inverse transformation data generated by the IFFT calculator 54 as the inverse transformation data that matches a standard. The selector 55 sends the selected inverse transformation data to the transmitter 56. A similar process is conducted on subsequent input signals, and inverse transformation data with the lowest PAPR is respectively sent to the transmitter 56.

The transmitter 56 combines the inverse transformation data selected by the selector 55 to generate a baseband signal, generates a transmission signal from the baseband signal and data specifying computations conducted to generate the selected inverse transformation data, and transmits the transmission signal to another device via the transmission/reception switch 76 and the antenna 50.

Figure 8:
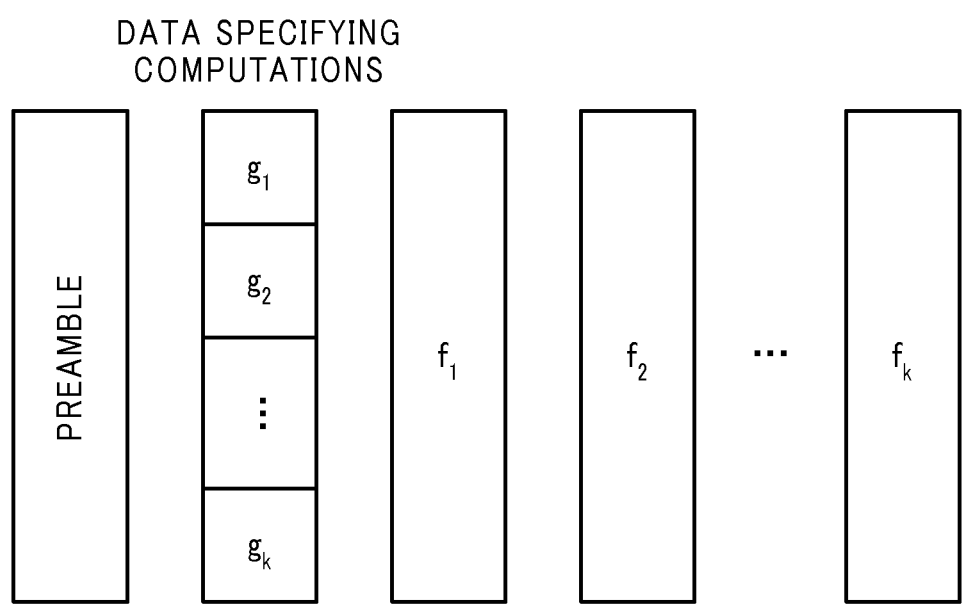
FIG. 8 is a block diagram illustrating an example of a transmission signal sent by the communication device according to the second embodiment.

FIG. 8 is a block diagram illustrating an example of a transmission signal sent by the communication device according to the second embodiment. The transmission signal includes a preamble, data specifying computations conducted to generate the selected inverse transformation data, and baseband signals $f_1, f_2, \ldots, f_k$. In the example in FIG. 8, k baseband signals are included in the transmission signal.

The above data specifying computations includes designated data $g_1, g_2, \ldots, g_k$ indicating whether the selected inverse transformation data was generated by converting a primary-modulated signal based on the input signal, the first computational data, or the second computational data from serial to parallel, and then applying the IFFT. The above data specifying computations is generated by applying primary modulation to and combining respective designated data indicating the input signal, the first computational data, or the second computational data, for example. The designated data may be 2-bit data. Provided that 2-bit data is used as the designated data, the primary modulation scheme is QPSK, and the FFT size is 2048, the data specifying computations may include 2048 sets of designated data. Note that the size of the designated data is arbitrary, and the value of designated data may be arbitrarily determined. Information about the size of designated data indicating the input signal, the first computational data, or the second computational data, as well as the value of designated data, is shared in advance between the transmission and reception sides. By including the above data specifying computations in the transmission signal, it becomes possible to correctly restore the input signal on the reception side.

Figure 9:
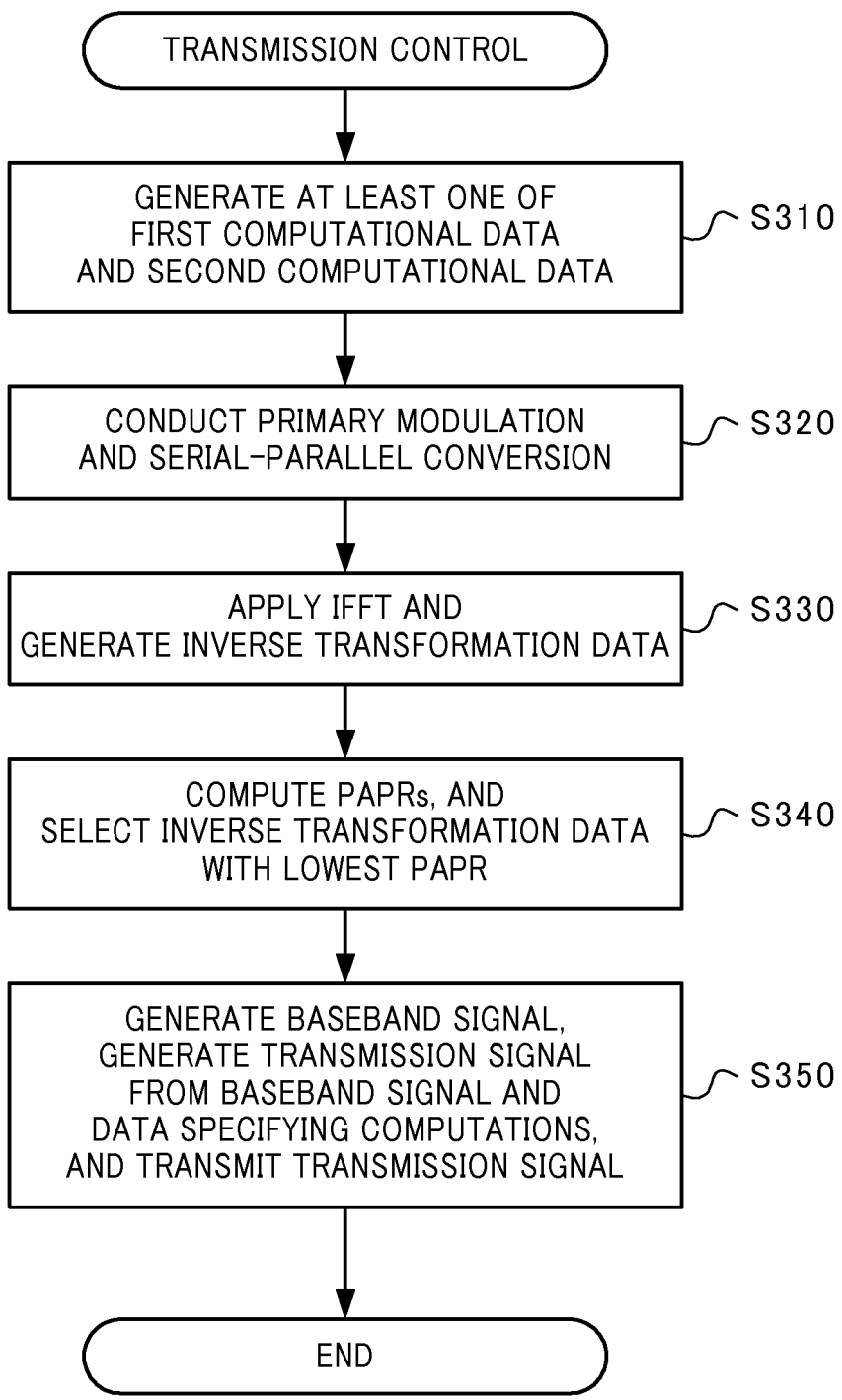
FIG. 9 is a flowchart illustrating an example of transmission control operation performed by the communication device according to the second embodiment.

FIG. 9 is a flowchart illustrating an example of transmission control operation performed by the communication device according to the second embodiment. The computational processor 51 generates at least one of first computational data whose elements are the values of the exclusive OR between each element of the input signal and the element in the binary signal at the same position as each respective element, and second computational data whose elements are the values of the exclusive OR between each element of the input signal and the element in the second binary signal at the same position as each respective element (step S310). The modulator 52 modulates the input signal, as well as at least one of the first computational data and the second computational data, according to a primary modulation scheme, and generates respective primary-modulated signals. The serial-parallel converter 53 converts the primary-modulated signals from serial to parallel (step S320).

The IFFT calculator 54 applies the IFFT to the converted primary-modulated signals, and respectively generates inverse transformation data (step S330). The selector 55 computes PAPRs of baseband signals based on the inverse transformation data, and selects the inverse transformation data with the lowest PAPR as the inverse transformation data that matches the standard (step S340). The transmitter 56 combines the inverse transformation data to generate a baseband signal, generates a transmission signal from the baseband signal and data specifying computations conducted to generate the selected inverse transformation data, and transmits the transmission signal to another device via the transmission/reception switch 76 and the antenna 50 (step S350). Once the transmission processing in step S350 is completed, the communication device 5 ends the process.

A process on the reception side is described below. The receiver 75 receives a transmission signal via the antenna 50 and the transmission reception switch 76, and generates data specifying computations on a transmission side as well as a baseband signal. The receiver 75 sends the data specifying computations on the transmission side to the inverse computational processor 71, generates a parallel signal by converting the baseband signal from serial to parallel, and sends the generated parallel signal to the FFT calculator 74. In the case where the data specifying computations on the transmission side is primary-modulated, the receiver 75 demodulates the data specifying computations on the transmission side according to a primary modulation scheme, and sends the demodulated data specifying computations on the transmission side to the inverse computational processor 71. Information about whether or not to demodulate the data specifying computations on the transmission side is held on the reception side.

The FFT calculator 74 applies the FFT to the parallel signal to generate transformation data, which is sent to the parallel-serial converter 73. The parallel-serial converter 73 converts the transformation data from parallel to serial, and sends the converted transformation data to the demodulator 72. The demodulator 72 demodulates the converted transformation data according to a primary modulation scheme to generate demodulated data, which is sent to the inverse computational processor 71.

The inverse computational processor 71 uses a binary signal, which is a set of elements of a same number as a number of elements in the demodulated data, and whose elements take a value of 1 or 0, as well as a second binary signal whose elements are ordered in reverse of elements in the binary signal, and based on the data specifying computations on the transmission side, outputs, as restored data, the demodulated data, first inverse computational data whose elements are values of exclusive OR between each element of the demodulated data and an element in the binary signal at a same position as each respective element, or second inverse computational data whose elements are values of exclusive OR between each element of the demodulated data and an element in the second binary signal at a same position as each respective element. The binary signal is the same as the binary signal used by the computational processor 51 on the transmission side.

In the case where the data specifying computations on the transmission side indicates that the inverse transformation data was generated based on the input signal, the inverse computational processor 71 outputs the demodulated data as the restored data. In the case where the data specifying computations on the transmission side indicates that the inverse transformation data was generated based on the first computational data, the inverse computational processor 71 outputs the first inverse computational data as the restored data. In the case where the data specifying computations on the transmission side indicates that the inverse transformation data was generated based on the second computational data, the inverse computational processor 71 outputs the second inverse computational data as the restored data. The restored data matches the input signal, and the input signal may be restored on the reception side.

Figure 10:
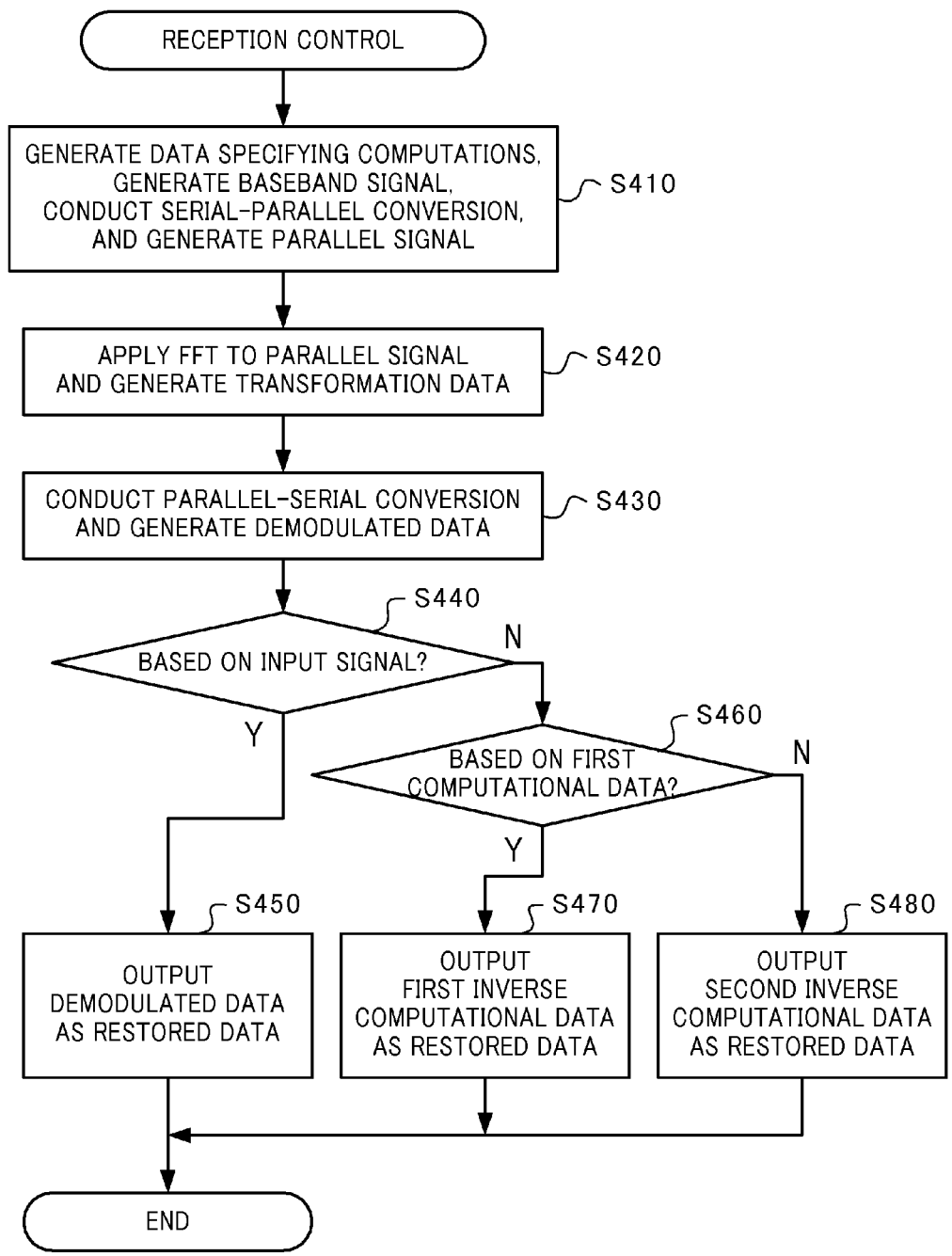
FIG. 10 is a flowchart illustrating an example of reception control operation performed by the communication device according to the second embodiment.

FIG. 10 is a flowchart illustrating an example of reception control operation performed by the communication device according to the second embodiment. The receiver 75 receives a transmission signal via the antenna 50 and the transmission/reception switch 76, generates data specifying computations on the transmission side as well as a baseband signal, and converts the baseband signal from serial to parallel to generate a parallel signal (step S410). The FFT calculator 74 applies the FFT to the parallel signal to generate transformation data (step 420). The parallel-serial converter 73 converts the transformation data from parallel to serial, and the demodulator 72 demodulates the converted transformation data according to a primary modulation scheme to generate demodulated data (step S430).

In the case where the data specifying computations on the transmission side indicates that the inverse transformation data was generated based on the input signal (step S440; Y), the inverse computational processor 71 outputs the demodulated data as the restored data (step S450). In the case where the data specifying computations on the transmission side indicates that the inverse transformation data was not generated based on the input signal, but rather generated based on the first computational data (step S440; N, step S460; Y), the inverse computational processor 71 outputs, as restored data, first inverse computational data whose elements are the values of the exclusive OR between each element of the demodulated data and the element in the binary signal at the same position as each respective element (step S470). In the case where the data specifying computations on the transmission side indicates that the inverse transformation data was generated based on neither the input signal nor the first computational data, or in other words that the inverse transformation data was generated based on the second computational data (step S440; N, step S460; N), the inverse computational processor 71 outputs, as restored data, second inverse computational data whose elements are the values of the exclusive OR between each element of the demodulated data and the element in the second binary signal at the same position as each respective element (step S480). Once the restoration processing in steps S450, S470, and S480 are completed, the communication device 5 ends the process.

As described above, according to a communication device 5 in accordance with the second embodiment of the present invention, it becomes possible to reduce the PAPR by performing the computations discussed above in an OFDM communication scheme. The computational processing discussed above is a simple method compared to repeating a calculation process according to a sequential decision method, and according to a communication device 5 in accordance with the second embodiment of the present invention, it becomes possible to simplify the process of reducing the PAPR.

(Specific Examples)

Next, advantageous effects according to the first embodiment will be described by simulation. Using a random signal as the input signal, simulations were conducted that repeatedly generated baseband signals and computed the PAPR according to the conventional art and according to the first embodiment. Setting the modulation scheme to QPSK and the FFT size to 2048, the CCDF (Complementary Cumulative Distribution Function) of the PAPR, or in other words the characteristics of PAPR likelihood, were compared between the conventional art and the first embodiment. The conventional art herein refers to a method that generates a baseband signal by modulating an input signal according to a primary modulation scheme, converting the modulated signal from serial to parallel, and applying the IFFT, without conducting computational processing as discussed earlier.

FIG. 11 is a diagram illustrating CCDF characteristics of PAPR of a baseband signal in the communication device according to the first embodiment. The horizontal axis represents the PAPR (units: dB), while the vertical axis represents the CCDF of the PAPR. For the first embodiment, respective simulations were conducted for the case of having one threshold value and setting the threshold value to 0 (Pattern 1), the case of having two threshold values and setting the threshold values to (0, 0.4) (Pattern 2), the case of having three threshold values and setting the threshold values to (−0.4, 0, 0.4) (Pattern 3), the case of having four threshold values and setting the threshold values to (−0.4, 0, 0.4, 0.8) (Pattern 4), and the case of having five threshold values and setting the threshold values to (−0.8, −0.4, 0, 0.4, 0.8) (Pattern 5).

The CCDF characteristics of the PAPR according to the conventional art are indicated by the thin solid line on the graph. For a communication device 1 according to the first embodiment, the CCDF characteristics of the PAPR for the Pattern 1 case are indicated by the bold solid line on the graph, the CCDF characteristics of the PAPR for the Pattern 2 case are indicated by the single-dashed chain line on the graph, the CCDF characteristics of the PAPR for the Pattern 3 case are indicated by the double-dashed chain line on the graph, the CCDF characteristics of the PAPR for the Pattern 4 case are indicated by the broken line on the graph, and the CCDF characteristics of the PAPR for the Pattern 5 case are indicated by the dotted line on the graph. All cases demonstrate that the PAPR according to the first embodiment is decreased compared to the conventional art. Since the PAPR varies depending on the number and value of the threshold values, controlling the extent of the reduction in the PAPR is possible by varying the number of threshold values, the standard for the determiner 16 on the transmission side, and the number of repetitions on the transmission side.

Also, a simulation was conducted using, as the input signal, a signal in which each element of the signal after primary modulation is in-phase, such as a flat signal whose values are all 0, for example. The PAPR in the conventional art for the case of using a flat signal as the input signal is 33.1 dB. FIG. 12 is a diagram illustrating the relationship between a threshold value and the PAPR of a baseband signal in the communication device according to the first embodiment. A simulation was conducted for the case of using a flat signal as the input signal, using one threshold value whose value was varied as illustrated in FIG. 12. In the case of setting the threshold value to 0, the PAPR of a baseband signal in a communication device 1 according to the first embodiment becomes 6.7 dB, demonstrating a large decrease compared to the conventional art. Consequently, by including 0 among the multiple preset threshold values as in equation (5) above, it becomes possible to reduce the PAPR, even if the input signal is a flat signal or a random signal.

Regarding the BER (Bit Error Rate), since the computations discussed earlier merely involve logic operations, the BER in a communication device 1 according to the first embodiment is inferred to be similar to the conventional art. However, data cannot be restored in the case of not correctly receiving the data specifying computations on the transmission side that is included in the transmission signal.

The above simulations demonstrate that, according to the first embodiment, performing the computations discussed earlier makes it possible to reduce the PAPR and control the extent of the PAPR reduction.

Next, advantageous effects according to the second embodiment will be described by simulation. Using a random signal as the input signal, simulations were conducted that repeatedly generated baseband signals and computed the PAPR according to the conventional art and according to the second embodiment. Setting the modulation scheme to QPSK and the FFT size to 2048, the CCDF of the PAPR, or in other words the characteristics of PAPR likelihood, were compared between the conventional art and the second embodiment. The conventional art herein refers to a method that generates a baseband signal by modulating an input signal according to a primary modulation scheme, converting the modulated signal from serial to parallel, and applying the IFFT, without conducting computational processing as discussed earlier.

Figure 13:
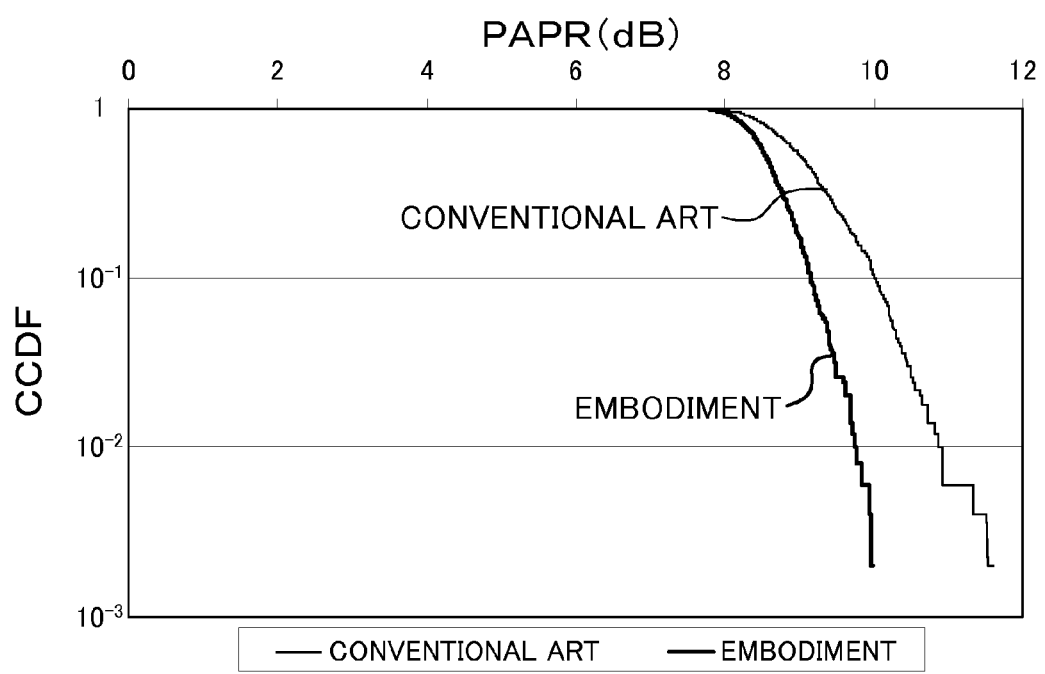
FIG. 13 is a diagram illustrating CCDF characteristics of a baseband signal in the communication device according to the second embodiment.

FIG. 13 is a diagram illustrating the CCDF characteristics of the PAPR of a baseband signal in the communication device according to the second embodiment. The horizontal axis represents the PAPR (units: dB), while the vertical axis represents the CCDF of the PAPR. With a communication device 5 according to the second embodiment, the binary signal p expressed in equation (8) above was used. The CCDF characteristics of the PAPR according to the conventional art are indicated by the thin solid line on the graph. The CCDF characteristics of the PAPR in a communication device 5 according to the second embodiment are indicated by the bold solid line on the graph. The graph demonstrates that the PAPR in a communication device 5 according to the second embodiment is decreased compared to the conventional art.

Regarding the BER, since the computations discussed earlier merely involve logic operations, the BER in a communication device 5 according to the second embodiment is inferred to be similar to the conventional art. However, data cannot be restored in the case of not correctly receiving the data specifying computations on the transmission side that is included in the transmission signal.

However, partial data may be correctly restored even in the case where, for example, there is transmitted data specifying computations on the transmission side indicating that the inverse transformation data was generated based on the first computational data, but the inverse computational processor 71 mistakenly outputs, as restored data, the second inverse computational data whose elements are the values of the exclusive OR between each element of the demodulated data and the element in the second binary signal at the same position as each respective element. Partial data refers to elements having the same values in both the binary signal p and the second binary signal $p^{-1}$ in reverse order. In the case where the modulation scheme is QPSK and the FFT size is 2048, the number of elements in the binary signal expressed by equation (8) above is 4096, and the number of prime numbers from 1 to 4096, or in other words the number of elements with the value 1 in the binary signal p, is 564. Consequently, correctly restoring the majority of data becomes possible, even in the case of mistaken restoration as above.

The above simulations demonstrate that, according to the second embodiment, performing the computations discussed earlier makes PAPR reduction possible.

An embodiment of the present invention is not limited to the foregoing embodiments. The modulation scheme of the modulator 13 and the modulator 52 is not limited to QPSK, and a scheme other than QPSK, such as PSK (Phase Shift Keying) or QAM (Quadrature Amplitude Modulation) may also be used. Also, the positions of the serial-parallel converter 14 and the serial-parallel converter 53 are not limited to the foregoing embodiments, and may also be placed before or after the computational processor 11 and the computational processor 51, respectively. Similarly, the positions of the parallel-serial converter 34 and the parallel-serial converter 73 on the reception side are not limited to the foregoing embodiments, and may also be placed before or after the inverse computational processor 31 and the inverse computational processor 71, respectively. The IFFT calculator 15 and the IFFT calculator 54 may also be configured to apply the IDFT instead of the IFFT, while the FFT calculator 35 and the FFT calculator 74 may also be configured to apply the DFT instead of the FFT.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A communication device that communicates with another device in orthogonal frequency-division multiplexing wireless communication, the communication device comprising:
   a computational processor that uses a binary signal, the binary signal being a set of elements of a same number as a number of elements in an input signal and with element values of 1 or 0, to generate computational data whose elements are values of exclusive OR between each element of the input signal and an element in the binary signal at a same position as each respective element;
   a modulator that modulates the input signal and the computational data according to a primary modulation scheme, and generates respective primary-modulated signals;
   an IFFT calculator that applies an inverse fast Fourier transformation to the primary-modulated signals to generate respective inverse transformation data; and
   a transmitter that generates a baseband signal based on the inverse transformation data whose peak-to-average power ratio matches a standard from among inverse transformation data generated by the IFFT calculator, and generates and transmits a transmission signal from the baseband signal and data specifying computations conducted to generate the inverse transformation data that matches the standard.

2. The communication device according to claim 1, further comprising:
   a determiner that computes a peak-to-average power ratio of a baseband signal based on inverse transformation data generated by the IFFT calculator, and determines whether or not the computed peak-to-average power ratio matches the standard.

3. The communication device according to claim 2, further comprising:
   a substitutor that generates the binary signal by substituting 1 or 0 in for each element of a data sequence, the data sequence being a set of real number data of the same number as the number of elements in the input signal, based on whether or not the each element is equal to or greater than a threshold value.

4. The communication device according to claim 3, further comprising:
   a repeater that repeats a process of changing the threshold value, conducting processing by the substitutor to generate a new binary signal, and conducting processing by the computational processor, the modulator, the IFFT calculator, and the determiner based on the new binary signal until inverse transformation data that matches the standard is detected.

5. The communication device according to claim 3, wherein
   the substitutor uses data comprising a real part or an imaginary part of a Constant Amplitude Zero Auto-Correlation (CAZAC) sequence as the data sequence.

6. The communication device according to claim 1, further comprising:
   a selector that computes peak-to-average power ratios of baseband signals based on inverse transformation data generated by the IFFT calculator, and from among the inverse transformation data generated by the IFFT calculator, selects inverse transformation data whose computed peak-to-average power ratio matches the standard.

7. The communication device according to claim 6, wherein the selector selects inverse transformation data with a lowest peak-to-average power ratio as the inverse transformation data that matches the standard.

8. The communication device according to claim 6, wherein
the computational processor uses a second binary signal, whose elements are ordered in reverse of elements in the binary signal, to additionally generate second computational data whose elements are values of exclusive OR between each element of the input signal and an element in the second binary signal at a same position as each respective element,
the modulator modulates the input signal, the computational data, and the second computational data according to the primary modulation scheme, and generates respective primary-modulated signals,
the IFFT calculator applies an inverse fast Fourier transformation to the primary-modulated signals, and generates inverse transformation data for each of the input signal, the computational data, and the second computational data, and
the selector selects inverse transformation data whose peak-to-average power ratio matches the standard from among inverse transformation data generated from the input signal, the computational data, and the second computational data.

9. The communication device according to claim 8, wherein
the computational processor uses, as the binary signal, a signal whose element value is 1 at elements where a number indicating element position is a prime number, and whose element value is 0 at all other elements.

10. A communication device that communicates with another device in orthogonal frequency-division multiplexing wireless communication, the communication device comprising:
a receiver that receives a transmission signal, generates data specifying computations on a transmission side and a baseband signal, and converts the baseband signal from serial to parallel to generate a parallel signal;
an FFT calculator that applies a fast Fourier transformation to the parallel signal to generate transformation data;
a demodulator that demodulates the transformation data according to a primary modulation scheme, and generates demodulated data; and
an inverse computational processor that uses a reception-side binary signal, the reception-side binary signal being a set of elements of a same number as a number of elements in the demodulated data and with element values of 1 or 0, to output, as restored data, one of the demodulated data or inverse computational data whose elements are values of exclusive OR between each element of the demodulated data and an element in the reception-side binary signal at a same position as each respective element, based on the data specifying computations on the transmission side.

11. The communication device according to claim 10, further comprising:
a reception-side substitutor that, in a case where the data specifying computations on the transmission side includes data indicating a threshold value, generates the reception-side binary signal by substituting 1 or 0 in for each element of a data sequence, the data sequence being a set of real number data of the same number as the number of elements in the demodulated data, based on whether or not the each element is equal to or greater than the threshold value.

12. The communication device according to claim 11, wherein
in the case where the data specifying computations on the transmission side includes data indicating the threshold value, the inverse computational processor outputs the inverse computational data as the restored data, and in a case where the data specifying computations on the transmission side does not include information about the threshold value, the inverse computational processor outputs the demodulated data as the restored data.

13. The communication device according to claim 11, wherein
the reception-side substitutor uses data comprising a real part or an imaginary part of a Constant Amplitude Zero Auto-Correlation (CAZAC) sequence as the data sequence.

14. The communication device according to claim 10, wherein
the inverse computational processor uses a second reception-side binary signal, whose elements are ordered in reverse of elements in the binary signal, and outputs, as the restored data, one of the demodulated data, the inverse computational data, or second inverse computational data whose elements are values of exclusive OR between each element of the demodulated data and an element in the second reception-side binary signal at a same position as each respective element, based on the data specifying computations on the transmission side.

15. The communication device according to claim 14, wherein
the inverse computational processor uses, as the reception-side binary signal, a signal whose element value is 1 at elements where a number indicating element position is a prime number, and whose element value is 0 at all other elements.

16. A communication method performed by a communication device that communicates with another device in orthogonal frequency-division multiplexing wireless communication, the communication method comprising:
a computational processing step of using a binary signal, the binary signal being a set of elements of a same number as a number of elements in an input signal and with element values of 1 or 0, to generate computational data whose elements are values of exclusive OR between each element of the input signal and an element in the binary signal at a same position as each respective element;
a modulating step of modulating the input signal and the computational data according to a primary modulation scheme, and generating respective primary-modulated signals;
an IFFT calculating step of applying an inverse fast Fourier transformation to the primary-modulated signals to generate respective inverse transformation data; and
a transmitting step of generating a baseband signal based on inverse transformation data whose peak-to-average power ratio matches a standard from among inverse transformation data generated by the IFFT calculating step, and generating and transmitting a transmission signal from the baseband signal and data specifying computations conducted to generate the inverse transformation data that matches the standard.

17. A communication method performed by a communication device that communicates with another device in orthogonal frequency-division multiplexing wireless communication, the communication method comprising:

a receiving step of receiving a transmission signal, generating data specifying computations on a transmission side and a baseband signal, and converting the baseband signal from serial to parallel to generate a parallel signal;

an FFT calculating step of applying a fast Fourier transformation to the parallel signal to generate transformation data;

a demodulating step of demodulating the transformation data according to a primary modulation scheme, and generating demodulated data; and an inverse computational processing step of using a reception-side binary signal, the reception-side binary signal being a set of elements of a same number as a number of elements in the demodulated data and with element values of 1 or 0, to output, as restored data, one of the demodulated data or inverse computational data whose elements are values of exclusive OR between each element of the demodulated data and an element in the reception-side binary signal at a same position as each respective element, based on the data specifying computations on the transmission side.

* * * * *